UNITED STATES PATENT OFFICE.

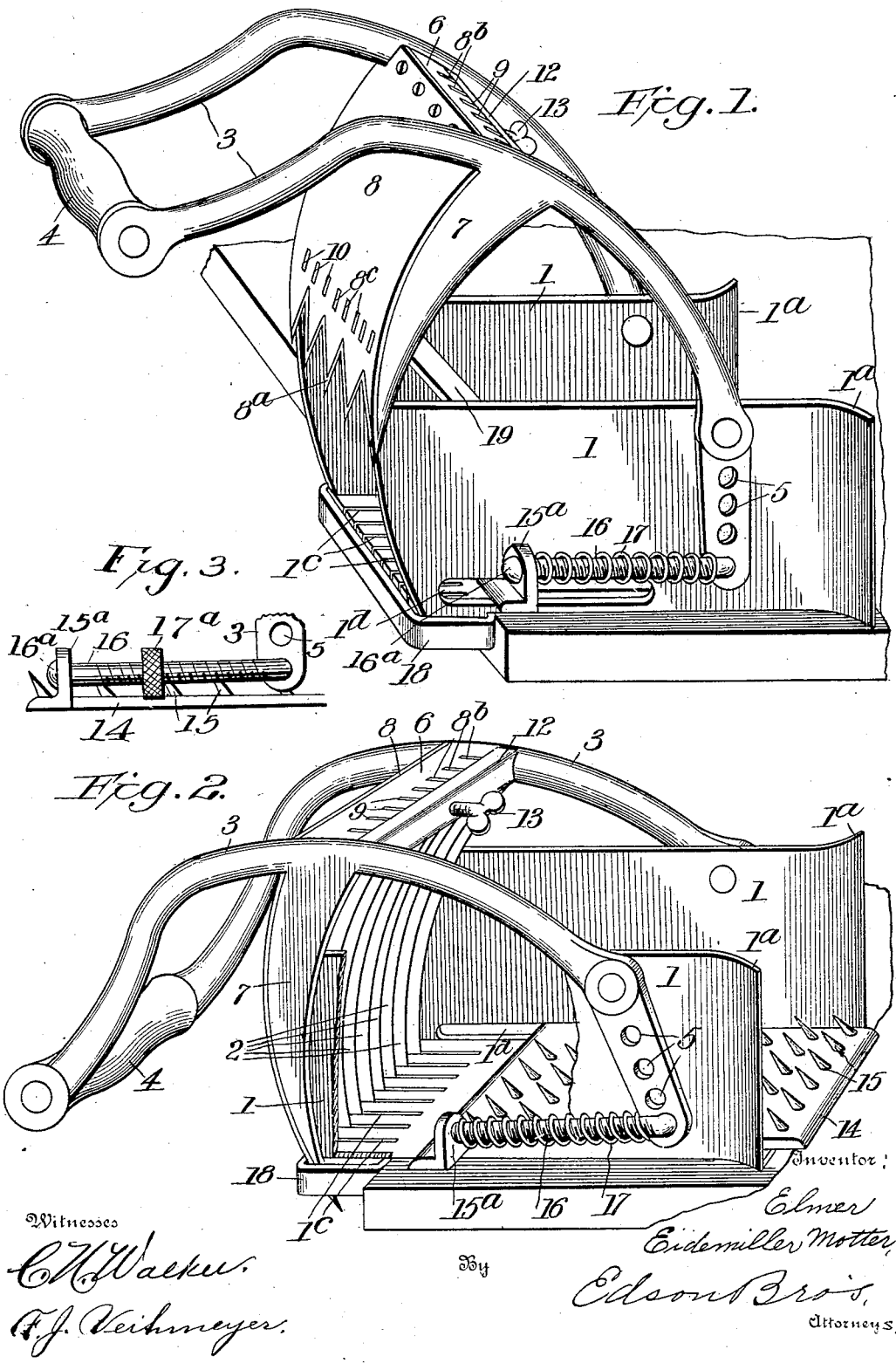

ELMER EIDEMILLER MOTTER, OF TIPPECANOE CITY, OHIO.

MACHINE FOR CUTTING FAT AND OTHER SUBSTANCES.

No. 862,927.

Specification of Letters Patent.

Patented Aug. 13, 1907.

Application filed November 23, 1906. Serial No. 344,767.

*To all whom it may concern:*

Be it known that I, ELMER EIDEMILLER MOTTER, a citizen of the United States, residing at Tippecanoe City, in the county of Miami and State of Ohio, have invented certain new and useful Improvements in Machines for Cutting Fat and other Substances; and I do hereby declare the following to be a full, clear, and exact description of the invention, such as will enable others skilled in the art to which it appertains to make and use the same.

My invention relates to improvements in machines for cutting fat and other substances but particularly designed for cutting fat into pieces of convenient size to be rendered into lard.

It has for its object to provide a machine of this nature which will be very simple in construction and so cheap of manufacture that it will be within the reach of farmers and butchers of moderate means.

The invention consists in the features of construction and combinations of parts hereinafter described and specified in the claims.

In the accompanying drawings, illustrating the preferred embodiment of my invention: Figure 1 is a perspective view of the machine with the operating levers carrying the knives raised. Fig. 2 is a similar view with said levers partly lowered. Fig. 3 is a broken detailed view of one of the feeder rods equipped with a nut instead of the spring.

Referring more particularly to the drawings, 1 is a box, preferably made of sheet metal, having its top and ends open thus making a free passage way for the fat to be cut to pass through. At one end the sides are flared outwardly as at 1ª to permit easy entrance of material to be fed into the machine, while at the other end, said sides are curved, as at 1ᵇ, to conform to the shape and movement of the knives. At this end narrow slots 1ᶜ are provided in the bottom of the box through which slicing knives 2 pass in the operation of the machine presently described. The box 1 is also provided with a slot 1ᵈ in each side directly along the bottom.

A double armed knife bearing lever 3, formed either as one casting or as an assembly of two or more castings, is pivoted to each side of the box near the flared ends of the sides. The long arms of said levers extend past the other end of the box and are connected by a wooden handle bar 4. The short arms of said levers extend downward and are provided with a series of holes 5. Said long arms are connected by a cross piece 6 to which, and to the downwardly curved portions 7 of the levers 3, is secured the cross-cut knife 8 having scallops 8ª at its edge. The number of said scallops and their depth may be varied to suit requirements and give the best results.

The cross piece 6 is provided with a series of slots 9, which are uniformly spaced apart in accordance with the thickness it is desired the slices shall be. Short slots 10 are also formed in the cross-cut knife, as shown in Fig. 4, and spaced in like manner as the slots in the cross piece. The slicing knives 2 are mounted perpendicularly against the concave side of the cross cut knife by inserting the projections 8ᵇ and 8ᶜ into the slots 9 and 10, respectively, and are secured in place by a strip or piece 12 which is clamped tightly upon the projections 8ᵇ by the thumb screw 13.

A feeder 14 comprising a plate with staggered pointed teeth or lugs 15 extending in the direction of the knives is arranged to slide on the bottom of the box 1. Said feeder plate preferably extends to the feed opening at the flared end of the box and has lugs 15ª extending through the slots 1ᵈ. To each of said lugs is connected a rod 16 having its other end inserted in one of the series of holes 5 in the short arm of the lever 3. Said rods 16 are preferably screw-threaded, as shown, but when used for cutting fat said rods are equipped with coiled springs 17.

A guard 18 consisting of a rectangular bent bar is secured to the outer end of the machine thereby forming with the bottom of the box a slot through which the cross-cut knife travels. It will thus be seen that both the slicing knives and the cross-cut knife pass between two edges thus giving them the greatest cutting efficiency. A cross bar 19 is arranged to span the top of the box far enough back from the cutter end to be out of the way of the slicing knives, said piece being intended to prevent the fat from rising with the knives when the levers are raised.

To operate the machine the levers are partly raised as shown in Fig. 1 and a piece of fat to be cut is inserted into the mouth of the machine and placed upon the feeder. The levers are then raised high enough to permit the passage of the fat out under it in position to be cut. The fat is fed out as the levers are being raised by the feeder being operated through the medium of the spring bearing rods 16 carried by the short arms of said levers. The operating levers are then depressed and the knives engage the fat and hold it while being cut so that the feeder cannot withdraw it as it is being retracted. At each stroke of the knives the protruding part of the fat which has been sliced on the previous stroke is cut off and a portion is sliced ready to be cut off in blocks on the next stroke. As soon as the levers commence to rise, the feeder is acted upon by the short arms of said levers but it is evident that it cannot push the fat forward until the knives are entirely above and out of engagement with the fat. The rods 16, therefore, move through the lugs 15ª while the springs 17 are compressed and advance the feeder as soon as the passage is cleared. It will be noted that by adjusting the end of each of the rods 16 in corresponding holes of the series 5, the thickness of the slices cut by the cross-cut knife is determined.

When the device is used as a bread cutter, as it may by removing the slicing knives, the springs are taken off and nuts 17ª (see Fig. 3) are screwed upon the screw-threaded portions thereof. This arrangement prevents the turning or other disarrangement of the loaf which is very liable to happen if the spring pressure feed were used. When used with the nuts, said feeder rods should engage the lowest holes in the short arms of the levers 3. The thickness of the slices may be regulated by adjustment of the nuts on the rods and it is evident that the feeder will only be moved forward or backward when engaged by said nuts or the knobs 16ª on the ends of said rods.

It may be stated that in making the box portion of the machine, the end in which the slots for the slicing knives are formed is preferably made entirely of wood or wood covered with the sheet metal of which the rest of the box is made. The wood is used to stiffen the slotted end of the box which would otherwise have no support against the pressure of the knives and is to extend in tapered form well back toward the mouth of the machine.

I claim:

1. In a machine of the character described, the combination, with a reciprocating cross-cut knife, of a series of slicing knives secured edge wise to the face thereof, each slicing knife tapering towards the cutting edge of said cross cut knife, means to reciprocate said knife and means to feed material to said knife.

2. A machine of the character described, the combination, with a pair of levers pivoted near their ends of a curved cross cut knife mounted between said levers and a series of slicing knives fitted edge wise to said cross-cut knife, said levers also having means for operating the same.

3. In a machine of the character described, the combination, with a pair of pivoted double armed levers, the long arms carrying a cross-cut knife and having means for operating the same, of a feeder plate adapted to be reciprocated toward and away from said knife, and means of connection between said feeder and the short arms of said levers for the purpose specified.

4. In a machine of the character described, the combination, with a pair of pivoted double armed levers, the long arms carrying a cross-cut knife having means for operating the same, of a guard for said knife, a feeder plate adapted to be reciprocated toward and away from said knife, and means of connection between said feeder and the short arms of said levers for the purpose specified.

5. In a machine of the character described, the combination, with a pair of pivoted double armed levers, the long arms carrying a cross-cut knife having means for operating the same, of a feeder plate adapted to be reciprocated toward and away from said knife, rods secured to the short arms of said levers and having loose connection with said feeder, and means on said rods for actuating said feeder plate.

6. In a machine of the character described, the combination, with a pair of pivoted double armed levers, the long arms carrying a cross-cut knife and having means for operating the same, of a feeder plate adapted to be reciprocated toward and away from said knife, the short arms of said levers provided with a series of holes, and connecting rods arranged between the feeder and said short arms and having their ends adapted to be inserted into any of said holes.

7. In a machine of the character described, the combination, with a pair of pivoted double armed levers, the long arms carrying a cross-cut knife and a series of slicing knives, and having means for operating the same, of a feeder plate adapted to be reciprocated toward and away from said knife, and means of connection between said feeder and the short arms of said levers for the purpose specified.

8. In a machine of the character described, the combination, with a pair of double armed levers pivoted at the juncture of said arms, the long arms carrying a cross-cut knife and a series of slicing knives, and having means for operating the same, of a feeder plate adapted to be reciprocated toward and away from said knife, rods secured to the short arms of said levers and having loose connection with said feeder, and means on said rods for actuating said feeder plate.

9. In a machine of the character described, the combination, with a box or frame having a series of slots in its bottom, of a pair of double armed levers pivoted at the sides of said box, the long juncture of said levers carrying a curved cross-cut knife adapted to pass across one end of said box, slicing knives secured to said cross-cut knife and adapted to travel in the slots in the bottom of the box, a feeder plate having staggered teeth inclined toward said knives, said feeder adapted to slide in the box and having lugs extended through slots in the sides thereof, rods secured to the short arms of said levers and loosely connected to said lugs, and means on said rods for actuating said feeder plate.

10. In a machine of the character described, the combination, with a pair of levers pivoted near the ends thereof, of a cross-cut knife secured thereto and curved to conform to the arc of its movement, of a series of slicing knives secured to said cross-cut knife and arranged perpendicular thereto, said slicing knives being wider at the top and tapered to a point at the bottom.

11. In a machine of the character described, the combination, with a pair of levers pivoted near the ends thereof, of a cross-cut knife secured thereto and curved to conform to the arc of its movement, said cross-cut knife having its cutting edge scalloped, of a series of slicing knives secured to said cross-cut knife and arranged perpendicular thereto, said slicing knives being wider at the top and tapered to a point at the bottom.

12. In a machine of the character described, the combination, with a pair of levers pivoted near the ends thereof, a slotted cross piece arranged between said levers, a cross-cut knife secured to said cross piece, a series of slicing knives having lugs fitted into the slots in said cross piece and other lugs fitted into slots in the cross-cut knife, and means to hold said slicing knives in place.

13. In a machine of the character described, the combination, with a pair of levers pivoted near the ends thereof and having depending projections, a slotted cross piece arranged between said levers, a cross-cut knife secured to said cross piece and to said depending projections of said levers, a series of slicing knives having lugs fitted into the slots in said cross-piece and other lugs fitted into slots in the cross-cut knife, and means to hold said slicing knives in place.

14. In a machine of the character described, the combination, with a pair of levers pivoted near the ends thereof, a cross piece arranged between said levers, a cross-cut knife secured to said cross piece, a series of slicing knives having lugs fitted into the slots in said cross-piece and other lugs fitted into slots in the cross-cut knife, and a strip clamped upon the cross piece by means of a thumb screw whereby said slicing knives are held in place.

15. In a machine of the character described, the combination, with a pair of pivoted double armed levers, the long arms carrying a cross-cut knife having means for operating the same, of a feeder plate adapted to be reciprocated toward and away from said knife, screw-threaded rods secured to the short arms of said levers and having loose connection with said feeder, and adjustable nuts mounted on said rods for the purpose specified.

In testimony whereof, I affix my signature, in presence of two witnesses.

ELMER EIDEMILLER MOTTER.

Witnesses:
R. A. KERR,
PHOEBE RATCLIFF.